United States Patent [19]

Plischke et al.

[11] Patent Number: 5,349,038
[45] Date of Patent: Sep. 20, 1994

[54] STAINBLOCKERS FOR NYLON FIBERS

[75] Inventors: Le Moyne W. Plischke, Lillian, Ala.; Rupert J. Snooks, Jr., Gulf Breeze, Fla.

[73] Assignee: Monsanto Company, St. Louis, Mo.

[21] Appl. No.: 136,187

[22] Filed: Oct. 15, 1993

Related U.S. Application Data

[63] Continuation of Ser. No. 891,069, Jun. 1, 1992, abandoned.

[51] Int. Cl.$^5$ ............................................. C08G 8/04
[52] U.S. Cl. ........................................ 528/150; 528/137; 528/143; 528/153; 428/96; 428/97; 428/395
[58] Field of Search ............... 428/96, 97, 395; 528/137, 143, 150, 153; 525/136

[56] References Cited

U.S. PATENT DOCUMENTS

| | | | |
|---|---|---|---|
| 4,507,324 | 3/1985 | Olivé et al. | 428/375 |
| 4,839,212 | 6/1989 | Blyth et al. | 428/96 |
| 4,883,839 | 11/1989 | Fitzgerald et al. | 525/136 |
| 4,937,123 | 6/1990 | Chang et al. | 428/96 |

Primary Examiner—John Kight, III
Assistant Examiner—Richard Jones

[57] ABSTRACT

Oligomeric condensation products including repeat units of the formula:

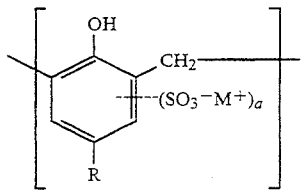

wherein
M$^+$ is a monovalent metal cation; and wherein $a=1$ or 2 and R is $C(R_f)_3$, or wherein $a=0$, 1 or 2 and R is

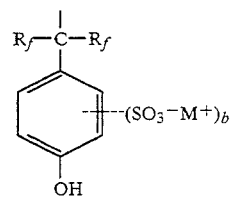

wherein
each $R_f$ group is independently selected from the group consisting of Fluorine (F) or a perfluoroalkyl group;
and $b=0$, 1 or 2; and
$a+b=0$, 1 or 2; with the proviso that
$a+b=1$ or 2 for at least about half of
said repeat units.

The products are useful as stainblockers in nylon carpets.

7 Claims, No Drawings

STAINBLOCKERS FOR NYLON FIBERS

BACKGROUND OF THE INVENTION

This application is a continuing application of copending Ser. No. 07/891,069 filed Jun. 1, 1992 now abandoned.

This invention relates to improved stainblockers for nylon fibers. The term "stainblockers", as used herein, means materials which, when applied to nylon fibers as a coating, improves the resistance of such fibers to staining when the fibers come into contact with acid dye colorants (e.g. Red Dye No. 40) under acid conditions.

Various stainblockers are described in the patent literature. U.S. Pat. No. 4,839,212 (Blyth et al.) describes partially sulfonated condensation products of formaldehyde and aryl hydroxides (i.e. phenols and naphthols) as being effective stainblockers. By "partially sulfonated" is meant that only a portion of the aryl groups contain sulfonate groups (e.g. —SO₃Y groups where Y is H, Na or K) attached directly thereto. In general, these products have a sulfonic acid equivalent weight ranging from about 300 to 1200, are water-soluble and can be applied to nylon fibers from an aqueous solution thereof. A very effective stainblocker of this type is the partially sulfonated condensation product of formaldehyde and 4,4'-dihydroxydiphenyl sulfone (DDS). Unfortunately, these stainblockers lack good lightfastness characteristics.

U.S. Pat. No. 4,937,123 (Chang et al.) describes polymethacrylic acid and copolymers of methacrylic acid as being effective stainblockers having good lightfastness characteristics. Unfortunately, these stainblockers offer less stain protection as compared to the stainblockers described in U.S. Pat. No. 4,839,212.

SUMMARY OF THE INVENTION

The present invention provides stainblockers having good lightfastness characteristics without sacrificing stainblocking characteristics.

The stainblockers of the present invention are partially sulfonated condensation products of one or more aldehydes (e.g. formaldehyde) and one or more aryl hydroxide(s) and are characterized in that at least 10 mole % of the aryl hydroxide(s) consist of one or more fluorine-containing phenol(s).

DETAILED DESCRIPTION OF THE PREFERRED EMBODIMENTS

The partially sulfonated condensation products of the invention are derived by reacting an aryl hydroxide reactant consisting of one or more aryl hydroxides with an aldehyde reactant consisting of one or more aldehydes. Preferably, the aldehyde reactant is formaldehyde. However, other aldehydes which may be used include acetaldehyde, furfuraldehyde or benzaldehyde.

The aryl hydroxide reactant comprises at least 10 mole % of one or more fluorine-containing aryl hydroxides, each of which is preferably of the formula:

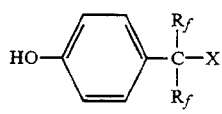

wherein
each $R_f$ group is independently selected from the group consisting of fluorine (F) and a perfluoroalkyl group (e.g. a $C_1$ to $C_4$ perfluoroalkyl group) and X is selected from the group consisting of fluorine (F), $R_f$ or

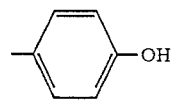

A preferred fluorine-containing phenol is 2,2'-bis (4-hydroxyphenyl) hexafluoropropane (BHP). The aryl hydroxide reactant may also comprise nonfluorine-containing aryl hydroxide(s), such as, 4,4'-dihydroxydiphenyl sulfone (DDS), sulfonated 4,4'-dIhydroxydephenyl sulfone, (sulfonated DDS), phenol, p-phenol sulfonic acid, naphthol and naphthol sulfonic acid. Sulfonated DDS is particularly preferred.

The products of the present invention are oligomers which include at least 10 mole % based on the total number of moles of aryl hydroxide units in the oligomer, repeat units of the formula:

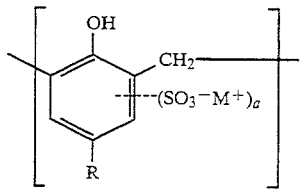

wherein
M⁺ is a monovalent metal cation; and wherein a=1 or 2 and R is $C(R_f)_3$, or wherein a=0, 1 or 2 and R is

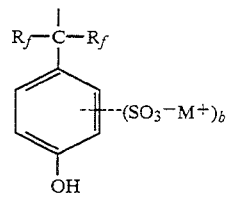

wherein
each $R_f$ group is independently selected from the group consisting of Fluorine (F) or a perfluoroalkyl group; and,
b=0, 1 or 2; and
a+b=0, 1 or 2; with the proviso that
a+b=1 or 2 for at least about half of said repeat units.

The values for a, b and a+b may be the same or different for each of the subject repeat units in the oligomer.

The product is preferably prepared by acetylating the aryl hydroxide reactant, sulfonating the acetylated product, hydrolyzing the sulfonated product and then condensing with the aldehyde reactant.

According to one preferred embodiment of the invention, the partially sulfonated condensation product of the invention is prepared using BHP as the aryl hydroxide and formaldehyde as the aldehyde. The resulting oligomer includes repeat units of the formula:

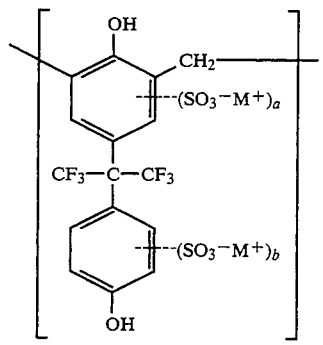

with M+ defined as above, and a=0, 1 or 2, b=0, 1 or 2 and a+b=0, 1, or 2 with the proviso that a+b=1 or 2 for at least about half of the subject units in the oligomer.

The values of a, b, a+b and c+d may be the same or different for each of the subject units in the oligomer.

Of the total number of the subject repeat units in the oligomer, preferably a+b=0 for about 38% of the units.

a+b=1 for about 50% of the units, and a+b=2 for about 12% of the units.

The product is prepared by acetylating BHP, sulfonating the resulting acetylated product, then, hydrolyzing the sulfonated product, followed by condensation thereof with formaldehyde.

According to another preferred embodiment of the invention, the partially sulfonated condensation product of the invention is prepared by using a mixture of BHP and DDS as the aryl hydroxide reactant and formaldehyde as the aldehyde reactant in which the mole ratio of BHP to DDS ranges from 1:9 to 9:1 and, preferably, from 5:1 to 9:1.

The resulting oligomer includes recurring units of the formulas:

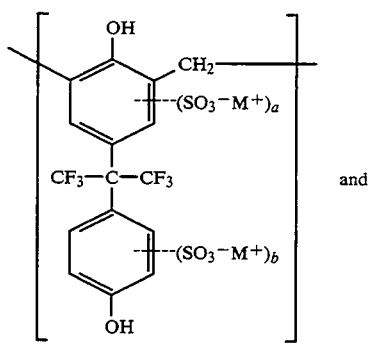

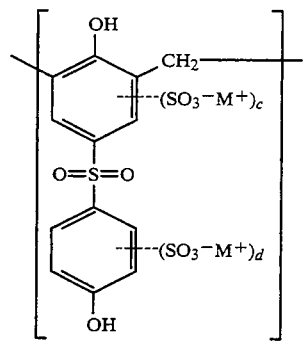

wherein M+ is defined as above;
a=0, 1 or 2;
b=0, 1 or 2;
c=0, 1 or 2;
d=0, 1 or 2;
a+b=0, 1 or 2 with the proviso that a+b=1 or 2 for at least about half of the (I) repeat units; and c+d=0, 1 or 2.

The values of a, b, c, d, a+b, and c+d may be the same or different for each of the subject repeat units in the oligomer.

Of the repeat units of the formula (I) in the oligomer, preferably about 45 to 505% contain one sulfonate group (a+b=1); up to about 12% contain two sulfonate groups (a+b=2); and 35 to 40% contain no sulfonate groups (a+b=0).

Products of the invention may be applied to nylon fibers by immersing the fibers (e.g. carpet) in an aqueous solution thereof. The pH of the solution is preferably in the range of 2.5 to 4.5. The solution is then heated to and maintained at or near the boil for a period of time sufficient to coat the nylon carpet fibers with a predetermined amount of the product. This amount can be calculated from the concentration of the product in solution and the weight ratio of solution to the nylon fibers. Normally, effective stain resistance is imparted to the carpet when the weight of product applied to the carpet fiber, based on the weight of fiber (o.w.f.), is in the range of 0.1 to 1.0%.

The following examples are given to further illustrate the invention. Unless otherwise stated, percentages are weight percentages.

EXAMPLE 1

This example illustrates the preparation of a partially sulfonated condensation product of 2,2-bis(4-hydroxyphenyl)-hexafluoropropane (BHP) and formaldehyde, a stainblocker of the present invention. This condensation product is abbreviated hereinafter as F/BHP.

The preparation is carried out in four steps. In the first step (acetylation step), 51.38 grams (0.1528 mole) of 2,2-bis(4-hydroxyphenyl)hexafluoropropane is added to a 300 ml 3-neck round bottom flask equipped with, mechanical stirrer, thermometer, and condenser. The flask is placed on a heating mantle and 19.12 grams (0.1873 mole) of acetic anhydride to which had been added 2 drops of concentrated sulfuric acid to catalyze the acetylation is added to the flask. The contents of the flask are heated for three hours at 100° C. with stirring. The resulting solution is clear and the color of gasoline.

In the second step (sulfonation step), concentrated sulfuric acid in the amount of 12.74 g (0.1299 mole) is added to the flask and the contents of the flask are heated at 100° C. for three hours. The resulting sulfonation product (79.78 grams) is reddish brown in color.

In the third step (hydrolysis step), thirty-seven ml of water is then added to the flask and the resulting solution, partially sulfonated BHP, is transferred to a 250 ml 1-neck round bottom flask fitted with a conventional condenser (Rotavapor ® condenser available from Brinkmann Instruments Co.) connected to a vacuum pump. The flask, fitted with the condenser, is placed in a water bath. The pressure in the flask is reduced to 20 mm. and the temperature of the water bath is gradually raised to 100° C. and held at this temperature for a period of two hours. The residue (liquid remaining in the flask) weighed 66.07 grams and is transferred back to the 300 ml 3-neck flask using water (13.88 grams) in small aliquot to assure all of the residue is transferred. A small amount of the resulting residue is subjected to High Performance Liquid Chromatography (HPLC) analysis. Analysis shows that 50.7% of the sulfonation product is mono-sulfonated, 12.0% is di-sulfonated and 37.3% is unsulfonated.

In the fourth step (condensation step), the 300 ml flask fitted with the mechanical stirrer, thermometer, and condenser adapted to provide a blanket of nitrogen for the condensation reaction is placed on the heating mantle. To the contents of the flask (sulfonation product) is added 7.26 grams of an aqueous solution of formaldehyde containing 37.9% of formaldehyde (2.75 grams or 0.09168 moles of formaldehyde). The solution is heated for 3.0 hours at 105° C., after which time 90 ml of water is added to the contents of the flask to produce a solution weighing 165.66 grams and containing an estimated 35% solids. To this solution is added 17.96 grams of a 50% aqueous solution of NaOH (8.98 grams) to neutralize the acid and 10.76 grams of a 30.3% aqueous solution of $NaHSO_3$ (2.69 grams) to tie up any free formaldehyde that may be present. The weight of the resulting solution is 175.69 grams. A sample of this solution (9.59 grams) is place in an aluminum cup. The cup containing the sample is placed in a 150° C. oven for 90 minutes to remove the liquid from the sample. The resulting residue (solids) weighs 3.77 grams. Analysis of the residue (solids) shows that 1.60% of the sample is $Na_2SO_4$ and 2.11% is NaAc (sodium acetate), indicating that the solution contains 39.25% solids of which 35.54% is F/BHP.

A stock solution containing 2.5% F/BHP is made up by adding 7.03 grams of the 35.54% F/BHP solution just prepared to 92.97 grams of deionized water.

The ability of F/BHP to impart stain resistance to nylon carpet is evaluated. As preliminary steps to the evaluation, test carpet and F/BHP test solution are prepared. The test carpet is prepared by plying together two 3.5 cotton count nylon 66 staple singles yarns with 4.0 tpi (157 tpm) to provide a plied yarn that is heatset using conventional Suessen equipment and conditions (i.e. 200 degrees C. for 1 minute). Each singles yarn consists of 18 denier, 7.5 inch (19.05 cm) staple length fibers. The heatset plied yarn is tufted on a 5/32 gauge cut-pile tufting machine into a polypropylene backing using seven stitches per inch (27.6 stitches per 10 cm) to provide a cut-pile carpet of saxony construction having a pile height of 5/8 inches (2.2 cm) and 32 oz. (0.091 Kg) of yarn per square yard (0.84 m²) of carpet. Five (5) gram test carpet samples are cut from this carpet.

A F/BHP test solution (300 grams) is formulated which contains sufficient F/BHP so that, when 15 grams of the solution is applied to one of the 5-gram carpet sample, the treated carpet sample contains 0.2% of F/BHP based on the weight of the carpet sample (o.w.c.). The 0.2% solutions is prepared by adding the following ingredients to 289.11 grams of deionized water (DI):
8.00 grams of F/BHP stock solution
6.37 grams of 4.0% $MgSO_4$ D.I. water solution
3.71 grams of 2.02% EDTA
EDTA (ethylenediaminetetraacetic acid) is added as a sequestering agent and $MgSO_4$ is added to enhance pickup of BHP stainblocker by carpet samples. A sufficient amount of concentrated sulfamic acid is added to the test solution to adjust the pH of the test solution to 2.5.

For purposes of comparison, a test solution is also formulated which contains sufficient F/DDS (partially sulfonated condensation product of formaldehyde and 4,4'-dihydroxydiphenyl sulfone) so that, when 15 grams of the solution is applied to a 5-gram carpet sample, the treated carpet sample contains 0.2% of F/DDS o.w.c.

In conducting the evaluations, six carpet samples are used—two samples are immersed in the 0.2% F/BHP solution, two samples are immersed in the 0.2% F/DDS solution and two samples are left untreated. The four immersed samples are removed from their respective solutions. Each sample is then weighed and, if necessary, the concentration of F/BHP or F/DDS, as the case may be, is adjusted so that the total weight of each sample plus solution is 20 grams (i.e. a 300% pick-up).

The treated carpet samples are then placed in a live steam chamber for five (5) minutes after which time they are removed from the chamber, rinsed with tap water and air-dried in a laboratory hood for a period of approximately 16 hours (overnight). Two of the dried treated samples and one untreated sample are then immersed in cherry Kool Aid ® for a period of seven hours. The weight ratio of Kool Aid to sample is 40 to 1. Cherry Kool Aid has a concentration of FD&C Red Dye No. 40 of 0.054 grams/liter. After the seven hour period, the carpet samples are removed from the Kool Aid, rinsed with cold water to remove excess Kool Aid and air-dried. The Red Dye No. 40 uptake of each sample is then determined by measuring the reflectance (K/S) value of the sample using a commercially available MacBeth MS-2000 Color Spectrophotometer with a 520 nanometer wavelength filter. The larger the K/S value is, the greater is the amount of Red Dye No. 40 taken up by the sample. The K/S value determined for each of these samples is given in Table I. The ability of the remaining carpet samples (two treated and one untreated) to resist yellowing when exposed to ultraviolet (UV) light is then determined by first measuring the yellowing index (YI) before and after exposure of each sample to a 40 AFU (AATCC Fading Units) using a Xenon-Arc Fade-O-Meter and then calculating delta (YI) which is the difference between the (YI) before exposure and the (YI) after exposure. The smaller the delta (YI) is, the better is the ability of the stainblocked sample to resist yellowing. The delta (YI) value of each of these latter carpet samples is given in Table I. The (YI) values are measured using an MS-2000 Macbeth Color Spectrophotometer.

TABLE I

| | CARPET SAMPLES | | |
|---|---|---|---|
| STAINBLOCKER | INVENTION F/BHP | COMPARISON F/DDS | CONTROL none |
| % Solids o.w.c. | 0.2 | 0.2 | 0 |
| F ppm o.w.c. | 503 | 32 | 0 |
| K/S Kool Aid | 0.08 | 0.10 | 3.21 |
| YI After UV Exposure | 3.91 | 6.60 | 2.94 |
| YI Before UV Exposure | 3.55 | 3.67 | 3.68 |
| YI Difference | 0.36 | 2.93 | −0.73 |

EXAMPLE 2

In this example two stainblockers of the invention are prepared and evaluated as described in Example 1, except in this instance an appropriate amount of the BHP used in Example 1 is replaced with an equimolar amount of DDS so that the mole ratio of BHP to DDS in one of the stainblockers is 70:30 and in the other is 50:50. The results of the Kool Aid staining and UV yellowing evaluations are given in Table II.

TABLE II

| | CARPET SAMPLES | | |
|---|---|---|---|
| % STAINBLOCKER o.w.c. | 0.2 | 0.2 | — |
| Mole % BHP/DDS | 70/30 | 50/50 | Control |
| F ppm o.w.c. | 334 | 217 | 16 |
| K/S Kool Aid | 0.13 | 0.08 | 3.21 |
| YI After UV Exposure | 7.58 | 7.97 | 3.25 |
| YI Before UV Exposure | 5.01 | 5.58 | 4.54 |
| YI Difference | 2.57 | 2.39 | −1.29 |

EXAMPLE 3

In this example, four additional stainblockers of the invention are prepared as described in Example 2, except in this instance, instead of replacing a portion of the BHP with DDS to provide a mixture of aryl hydroxides, an appropriate molar amount of either p-phenol sulfonic acid (PSA) or naphthol sulfonic acid (NSA) is added in each preparation after the sulfonation step and prior to the condensation step so as to provide the mole ratios shown in TABLE III below.

TABLE III

| Stain- | MOLE % | | | |
|---|---|---|---|---|
| blocker | F/BHP | F/PSA | F/NSA | F/DDS |
| 3A | 80 | 20 | — | — |
| 3B | 80 | — | 20 | — |
| 3C | 10 | — | — | 90 |
| 3D | 90 | — | — | 10 |

The stainblockers shown in Table III have stainblocking and lightfastness characteristics comparable to those of the stainblockers shown in Examples 1 and 2.

The results given in the examples show that the partially sulfonated condensation products of the present invention have good lightfastness as compared to the prior art partially sulfonated condensation products and stain resistance as good as and in some instances better than the prior art products.

We claim:

1. An oligomer comprising at least 10 mole %, based on the total number of moles of aryl hydroxide units of said oligomer, repeat units of the formula

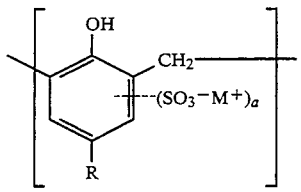

wherein

M+ is a monovalent metal cation; and wherein a=1 or 2 and R is $C(R_f)_3$, with each $R_f$ group being independently selected from the group consisting of Fluorine or a perfluoroalkyl group; or wherein a=0, 1 or 2 and R is $$R_f-C-R_f$$

(with phenyl ring bearing $-(SO_3^-M^+)_b$ and OH)

wherein each $R_f$ group is independently selected from the group consisting of Fluorine (F) or a perfluoroalkyl group;

b=0, 1 or 2; and a+b=0, 1 or 2; with the proviso that a+b=1 or 2 for at least about half of said repeat units in said oligomer.

2. A stainblocker comprising the oligomer of claim 1.

3. A nylon carpet fiber including a coating applied thereto, said coating comprising about 0.1% to about 1.0%, based on the weight of said fiber, of the oligomer of claim 1.

4. An oligomer comprising at least 10 mole %, based on the total number of moles of aryl hydroxide units in said oligomer, repeat units of the formula:

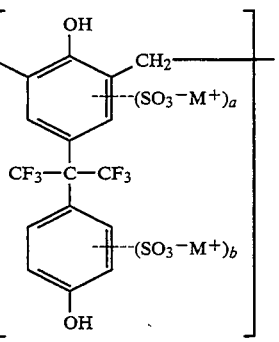

wherein M+ is a monovalent metal cation, and a=0, 1 or 2; b=0, 1 or 2; and a+b=0, 1 or 2; with the proviso that a+b=1 or 2 for at least about half of the subject units in the oligomer.

5. The oligomer of claim 4 wherein a+b=1 for about 45% to 55% of said repeat units; a+b=2 for up to 12% of said repeat units; and a+b=0 for about 35% to 40% of said repeat units, based on the total number of said repeat units in said oligomer.

6. The oligomer of claim 4 further including repeat units of the formula
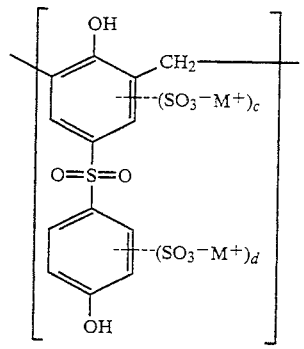
wherein c=0, 1 or 2; d=0, 1 or 2; and c+d=0, 1 or 2.
7. The oligomer of claim 4 wherein a+b=0 for about 38% of said repeat units; a+b=1 for about 50% of said repeat units; and a+b=2 for about 12% of said repeat units, based on the total number of said repeat units in said oligomer.
* * * * *